(12) United States Patent
Banks et al.

(10) Patent No.: US 7,490,115 B2
(45) Date of Patent: Feb. 10, 2009

(54) COMMITMENT CHAINS FOR CONFLICT RESOLUTION BETWEEN DISCONNECTED DATA SHARING APPLICATIONS

(75) Inventors: Andrew David James Banks, Romsey (GB); Michael Cobbett, Eastleigh (GB); David Robnett Vyvyan, Southampton (GB); Mark Andrew Wynn-Mackenzie, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 11/322,031

(22) Filed: Dec. 29, 2005

(65) Prior Publication Data

US 2006/0206534 A1    Sep. 14, 2006

(30) Foreign Application Priority Data

Mar. 9, 2005   (GB) ................................ 0504810.3

(51) Int. Cl.
G06F 17/30   (2006.01)
G06F 7/00    (2006.01)

(52) U.S. Cl. .......................... 707/204; 707/8; 707/203; 707/201

(58) Field of Classification Search ....................... None
See application file for complete search history.

(56) References Cited

U.S. PATENT DOCUMENTS

| | | | |
|---|---|---|---|
| 5,806,076 A | | 9/1998 | Ngai et al. |
| 6,343,299 B1 * | | 1/2002 | Huang et al. ................ 707/203 |
| 6,557,082 B1 | | 4/2003 | Josten et al. |
| 7,089,244 B2 * | | 8/2006 | Shi et al. ........................ 707/9 |
| 2002/0099728 A1 * | | 7/2002 | Lees et al. ................... 707/203 |
| 2003/0093441 A1 * | | 5/2003 | Cooke et al. ................ 707/203 |
| 2003/0149709 A1 | | 8/2003 | Banks |
| 2004/0111390 A1 * | | 6/2004 | Saito et al. ..................... 707/1 |
| 2005/0235018 A1 * | | 10/2005 | Tsinman et al. ............. 707/204 |
| 2006/0265434 A1 * | | 11/2006 | Kathuria et al. ............. 707/204 |

OTHER PUBLICATIONS

"Nested Transactions" OLE DB Programmer's Reference, (viewed Feb. 12, 2004).

* cited by examiner

*Primary Examiner*—Pierre M Vital
*Assistant Examiner*—Sheikh M Kabir
(74) *Attorney, Agent, or Firm*—Akerman Senterfitt

(57) ABSTRACT

A sequence of processing transactions operating on a cached data set, which depend on each other because they operate on the same items of data from the data set. The transactions are saved until the master copy of the data becomes available. The transactions are played back against the master copy until one of the played back transactions fails because another transaction which operated on the same items of data but against a separate cached copy and originating from another application, was successfully played back on the master copy at an earlier time. At this point, all subsequent transactions which depended on the failing transaction are rolled back on the cached copy (with appropriate failure reports generated) and activity resumes from there. "Chained" (optimistic) transactions can therefore be applied to cached data and can be allowed to progress by recording their dependencies so they can be undone when required.

12 Claims, 5 Drawing Sheets

COMMITMENT CHAINS FOR CONFLICT RESOLUTION BETWEEN DISCONNECTED DATA SHARING APPLICATIONS

CROSS-REFERENCE TO RELATED APPLICATIONS

This application claims the benefit of United Kingdom Patent Application No. 0504810.3 filed Mar. 9, 2005.

FIELD OF THE INVENTION

The present invention relates to methods, apparatus and computer programs for consolidating updates to replicated data.

BACKGROUND OF THE INVENTION

A known server in a distributed system can maintain a cache of resources locally to provide independence from centralised infrastructure and/or performance benefits of avoiding network communications. Applications executing on that server make updates to the resources, generally being unaware of the existence of the local cache. If these updates are transactional, then the locks and log entries used to maintain the transactionality will also only have scope local to the server.

At some point it will be appropriate to reconcile the updates made locally with some master state held in a central server. At this point it May be discovered that the state of the updated resources has been changed since the last time the cache was reconciled. Either direct updates on the server may have taken place, or another peer distributed server may have successfully reconciled some changes to the same resources. Since the basis on which the applications made their updates to the cache are now invalid (or at least questionable) it would not be appropriate to reflect those updates in the master state.

In a replicated messaging system using optimistic locks, several applications acting on different replicas may attempt to consume the same message. These actions may be asynchronous. This will be resolved when an arbitrating server ultimately commits one of the optimistic transactions and rolls back all of the others.

U.S. Published Patent Application 2003/0149709 to Banks discloses enabling one or many replicas of a data resource to be updated independently of a master copy of the data resource, and then each replica to be separately consolidated with the master copy. If a data update is applied 'optimistically' to a local replica and conflicts with updates applied to the master copy (since the last consolidation with that replica), then the local update will not be applied to the master copy. All updates are treated the same and rolled back together.

Transactions in such a server fail due to contention when they try to consume or update data that no longer exists. This arises in cases where the updated data is shared between updaters—i.e. accessible to several of them. One of the reasons for failing is that one update, although not conflicting with a prior update, is dependent on a conflicting update.

A system holding a local cache may keep any records which are part of an optimistic transaction locked until the optimistic transaction is committed in the master server. This prevents any other applications running against that local cache from making changes dependent on the optimistic data. So once a cache has been updated, no more updates can be made until the optimistic transaction involving that message has been committed in the master server.

SUMMARY OF THE INVENTION

In one aspect of the present invention there is provided a method for managing updates to a replicated data resource, including the steps of: in response to a first update and one or more dependent updates applied to a first replica of the data resource at a first data processing system, and comparing the updates with a master copy of the data resource held at a second data processing system. For the updates which do not conflict with the master copy, the non-conflicting updates are applied to the master copy; and for the updates which conflict with the master copy due to other updates applied to the master copy, the method includes sending to the first data processing system an instruction to back out the conflicting updates from the first replica and to replace them in the first replica with the corresponding other updates applied to the master copy.

The appropriate time to reconcile the local updates with the master could be after every transaction on the server owning the cache. This would give rise to the behaviour similar to the technique of optimistic locking. However, in a distributed system where less frequent reconciliation is appropriate, it is not desirable to hold exclusive locks on updated resources until the reconciliation occurs. It is proposed that other transactions in the distributed server are allowed to execute and a composite reconciliation is performed following the execution of a set of transactions. Multiple transactions in the period between reconciliations may update the same cached resource. As the time between reconciliations increases, so will the number of updates that are at risk of failing to reconcile.

It is recognised that the set of transactional updates arising from a set of unreconciled transactions can be captured as a history in the distributed server that owns the cache. The set of transactional updates will have a number of dependencies with it—a second transaction may make a further update to a resource updated from the reconciled state by a first transaction.

During reconciliation, each transaction in the history is replayed against the master state. As each of the transactions originally performed on the distributed server against the cache is replayed it may encounter an initial state in the master that does not match that which was in the cache at the equivalent point. That transaction against the master state should be rolled-back, and any subsequent transaction in the history that depends upon state updated by that transaction should not be replayed, and also needs correcting in the cache from which the history is being replayed. This management of the replayed transactions must be robust even in the event of the rollback—the failure must assuredly provoke the corrective action.

The effect of this behaviour will be to propagate as many of the transactions as possible from the distributed server cache to the master state as possible. Depending on the likely contention for the same resource in the master state by applications executing in multiple distributed servers maintaining caches, the overall yield of successful transactions will vary with less contention leading to higher yield, and frequent reconciliation leading to less contention.

It can be observed that the replay of history from a set of transactions is somewhat similar to the process of forward recovery of a point in time backup of a database using a log. This invention assumes that multiple histories (logs) can be replayed, potentially concurrently, to bring the master state up to date.

This solution allows a chain of optimistic transactions. Optimistic transactions progress on the assumption that prior optimistic transactions commit. The chain of transactions can be arbitrarily long; however, long chains increase the probability of ultimate failure. The transactions may have arbitrary dependencies on the prior transactions. Chains of optimistic transactions may branch into multiple chains. Chains of optimistic transactions may also join together.

Applications running optimistic transactions against a replica of the messages record the history of their processing. When a communications connection is made with the master arbitrating server the optimistic transaction history is replayed against the master data store. If no conflicting updates are detected, i.e. there were no clashes of the optimistic locks, then the optimistic transaction becomes the ultimate transaction which commits, as an ACID transaction.

Optimistic transactions are replayed in the master server in the same order that they were generated against a particular replica, therefore they will only ultimately commit if an optimistic transaction they depend on has already committed.

An application can update a message in a local cache so long as no other application is in the process of updating that message. In other words it can make an update so long as no other application has updated that message as part of any uncommitted optimistic transaction run against that cache.

Once an optimistic update has been made in the local cache and optimistically committed, then further optimistic updates are allowed by applications as part of other optimistic transactions. Optimistic transactions are replayed in the master server in the same order that they were optimistically committed in each cache. If the master server detects that an optimistic transaction makes a conflicting update, then it is rejected, causing the optimistic transaction to be undone. All other optimistic transactions which also depend on the same conflicting change are also rolled back.

Some restrictions apply if a resource manager is joined using a classic ACID transaction with an optimistic transaction running against a local cache. For example, the transaction branch in the resource manager must be prepared before the optimistic transaction is sent to the master server and data modified in the resource manager as part of the transaction branch must remain locked until the outcome is received from the master server.

The solution should respect the following basic test case: two disconnected local caches, A and B, each share data replicated off a master server, with 'cs' being a shared replicated message.

Optimistic transaction 1A on A: consume 'cs' and produce 'pa'

Optimistic transaction 2A on A: consume 'pa' and produce 'paa'

Optimistic transaction 3A on A: consume 'paa' and produce 'paaa'

Optimistic transaction 1B on B: consume 'cs'

B connects to the master server and replicates before A—its optimistic transaction 1B succeeds and commits. When A replicates, it should have failures reported for all 3 of its optimistic transactions. The tree can be persisted efficiently by keeping a transaction ID pair against each data resource element to indicate when it was produced and when (if) it was consumed. The tree can otherwise be kept in memory as a tree structure to allow fast deletes. In this case, before B connects and replicates, client A's data table would look like:

Client A:

| Resource | Transaction Produced | Transaction Consumed |
|----------|---------------------|----------------------|
| cs       | 0                   | 1A                   |
| pa       | 1A                  | 2A                   |
| paa      | 2A                  | 3A                   |
| paaa     |                     | 4A                   |

Transactions applied on cached data, whose master copy is shared between independent applications, are not able to progress if they depend on changes made by prior transactions on the same items of data. This is because conflicting changes may have been made to the equivalent items of data in a separate cache and these changes may take priority. One known solution is to lock the cached data changed by the prior transaction until it has been successfully played back against the master copy. This delays the dependent transactions.

A solution relates to a sequence of two (or more) transactions operating on a cached data set, which depend on each other because they operate on (at least one) same items of data from the data set. The transactions are saved until the master copy of the data becomes available at which point they are played back against it. This continues until one of the played back transactions fails because another completely independent transaction, which operated on the same items of data but against a separate cached copy and originating from another independent application, was successfully played back on the master copy at an earlier moment in time. At this point, all subsequent transactions which depended on the failing one are rolled back on the cached copy (with appropriate failure reports generated) and activity resumes from there. This invention therefore allows "chained" (optimistic) transactions applied to cached data to progress by recording their dependencies so they can be undone when required.

BRIEF DESCRIPTION OF THE DRAWINGS

Preferred embodiments of the invention will now be described in more detail, by way of example, with reference to the accompanying drawings in which.

DETAILED DESCRIPTION OF THE PREFERRED EMBODIMENTS

The following terms are used in this description. 'Consumption' means deletion of a message. An update is achieved by consumption of one message and production of another. The terms 'consumption' and 'update' are used interchangeably. 'Asynchronous' means that client transactions are made to their local cache as if it were the master data—therefore not needing to block for confirmation that their transaction was really successful. 'Shared data' means that the local cache or replica is a copy of data that is logically on offer to multiple consumers. 'Optimistic transaction' means the initial optimistic processing of the messages—operations are grouped and persisted in a transactional manner. 'Ultimate transaction' means the definitive step that records the ultimate result of an optimistic transaction's success.

Figure 1:
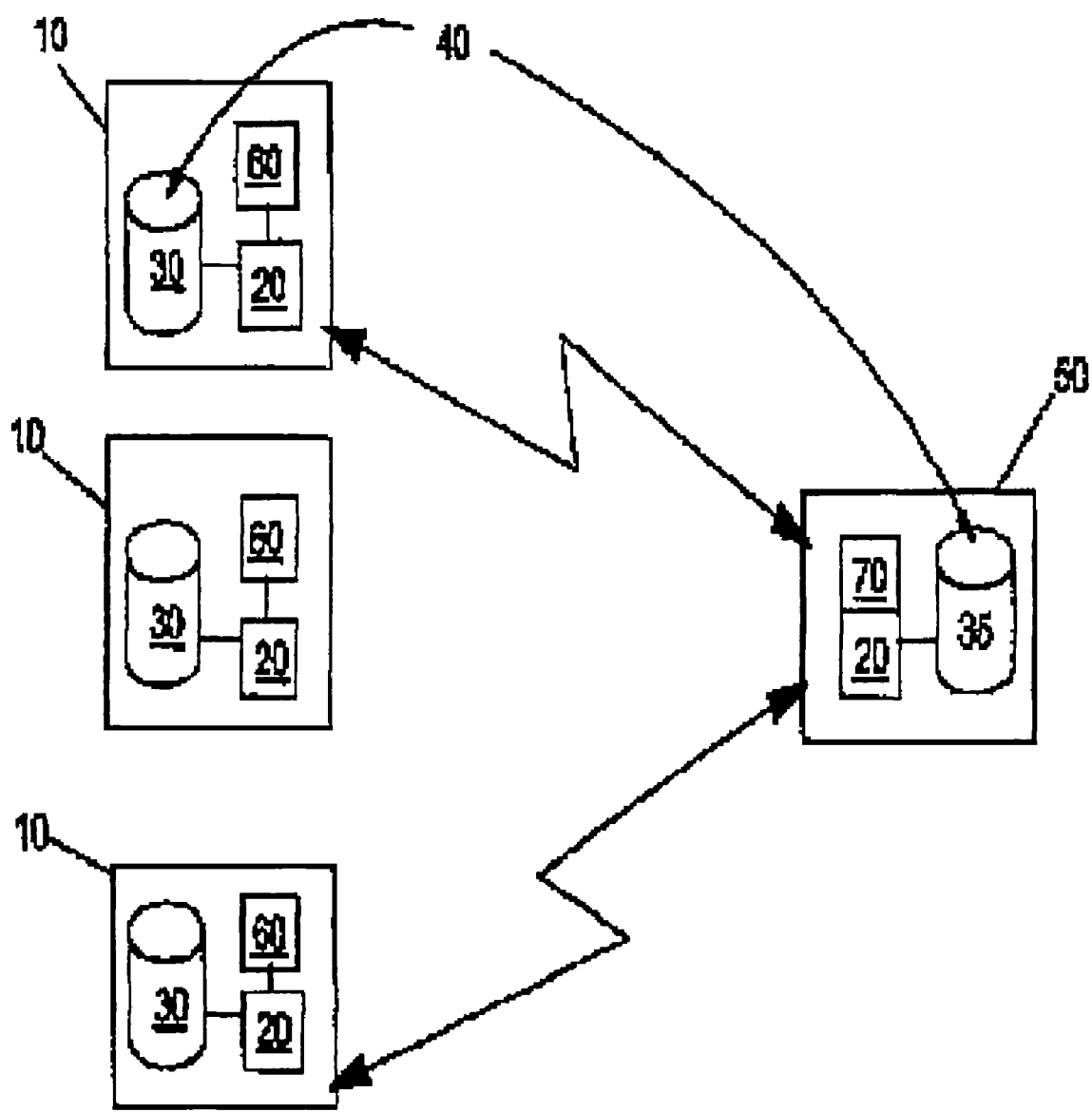
FIG. 1 is a schematic representation of a network in which the present invention may be implemented.

As shown in FIG. 1, a plurality of client data processing systems 10 are each running an application program 60 and a database manager program 20 and each hold a replica 30 of a database 40. Each client system 10 is connectable to a server data processing system 50 which is also running a database manager program 20 and holds a master copy 35 of the database 40. The present invention is applicable to any network of data processing systems in which the client systems are capable of running the database manager program to maintain their local replica of the database, but is particularly suited to applications in which a number of replicas are updated on mobile devices or desktop workstations before being consolidated with the master copy held on a back-end server computer. The invention is especially useful in environments in which either a large number of client systems may need to concurrently apply local updates to the database, or a number of the client systems rely on wireless communications to connect to the server computer and so cannot rely on permanent availability of connections.

An implementation of the present invention will now be described using the illustrative example of an airline reservation application in which users (such as travel agents and airline employees) working at a number of client workstations each need to be able to process their customers' requests to book seats on an airline.

The reservation application 60 sees each table of the local replica database as if it is the only copy, and as if only that application is accessing it. For illustration, the table could be a simple hash table of data and an index. Hidden from the application's view within a consolidation process 70 of the database manager 20 is some more state information.

For each element in the table, the following information can be held and sent as part of an update consolidation request (as will be described further below):

The use of the protected Object oldUnderlyingObject (the before image), sequence numbers and consolidation processing will be described later.

For the table as a whole, the following information is also held and sent in update consolidation requests:

```
protected long highestTableSequenceNumber = 0;   // The highest
    tableSequenceNumber in the entire table.
                        // This may be higher than any recorded in our
    version of the table
                        // because our update may have been the latest;
    it also allows the
                        // master to detect that this is a repeat update.
```

Figure 2:
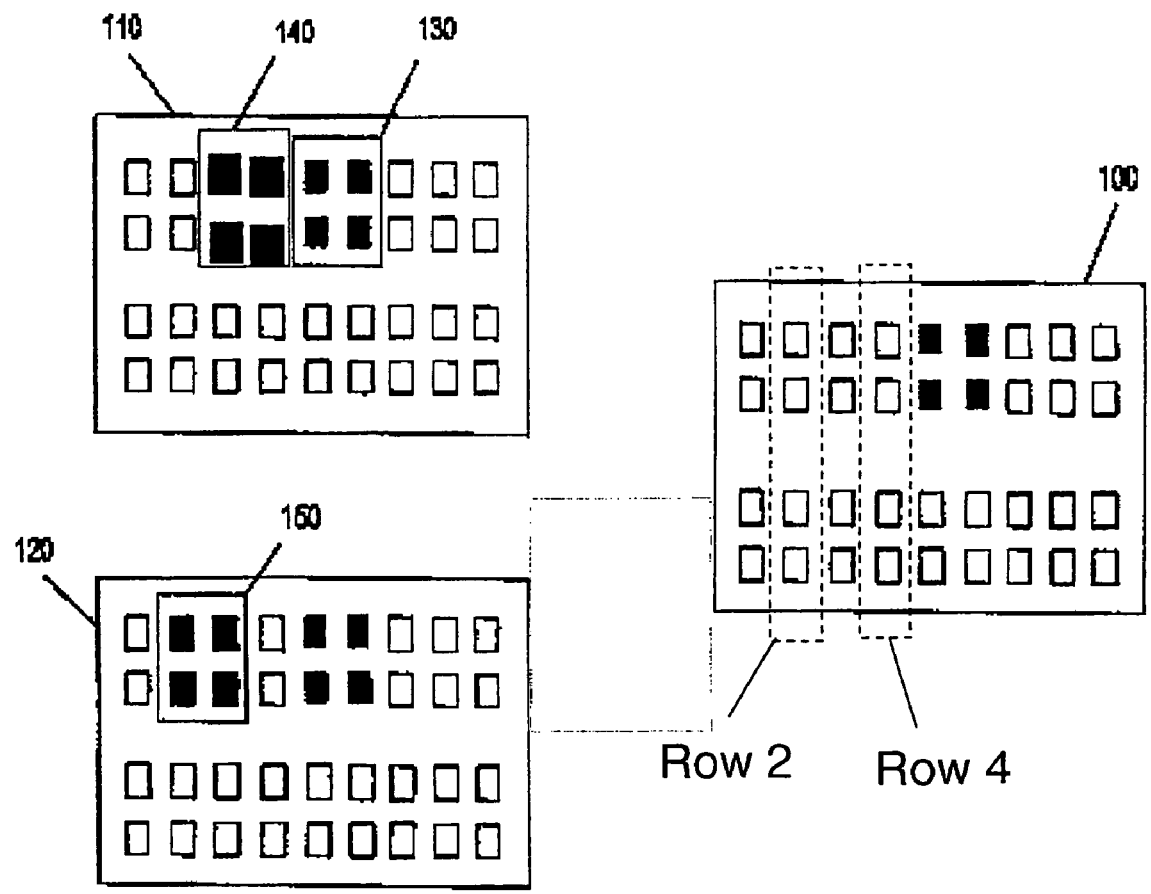
FIG. 2 is an example user view of seat availability within an aircraft within an airline reservation system implementing the present invention.

The user's view of seat availability for the airline is as shown in FIG. 2, with each specific seat being a separately identifiable data element of the database and being separately reservable. FIG. 2 shows three views of the data resource—the master copy 100 as updated at the server, a first replica 110 and a second replica 120.

A first set of data elements 130 corresponding to seats in an aircraft have been updated and the replicas 110, 120 of the data resource have each been consolidated with the master copy 100 so that the reservation is now reflected in each of the replicas. Subsequent to that consolidation, further updates are made concurrently to replica 110 and replica 120. A first update 140 to replica 110 indicates a desire to reserve four seats in rows 3 and 4. The replica 110 entry is not locked. However, for the nested updates involving modified entries are recorded as being dependent on the updates that modified them. All local updates are in-doubt (uncommitted) until the server has successfully applied itself and returned a confirmation of success.

An update 150 of replica 120 indicates a desire to reserve four seats in rows 2 and 3, but the user of the client system of replica 110 has concurrently attempted to reserve two of these four seats. Replica 120 is optimistically updated concurrently with replica 110. Again the updated elements within replica 120 are not locked and are available for further (dependent) updates. Which of these replicas 110, 120 has its local updates successfully applied to the master copy 100 of the database depends on which client system is first to notify the server system of its desire for consolidation.

```
protected Object underlyingObject;           // The application object being contained.
protected Object oldUnderlyingObject;        // The before image, in case we back out.
protected Object key;                        // The object identifier key.
protected long unitOfWorkIdentifier = 0;     // Unit of work for an update.
protected long tableSequenceNumber = 0;      // Server/Master sequence number of last
    table update
                                             // we received.
protected long sequenceNumber = 0;           // Sequence number of last object update we
    made,
                                             // incremented by 1.
int state;                                   // The current state of the managedObject.
                                             // The lifecycle of the object.
static final int stateError = 0;             // A state error has occurred.
static final int stateConstructed = 1;       // Not yet part of a transaction.
static final int stateAdded = 2;             // Added.
static final int stateReplaced = 3;          // Replaced.
static final int stateDeleted = 4;           // Deleted.
```

Figure 3:
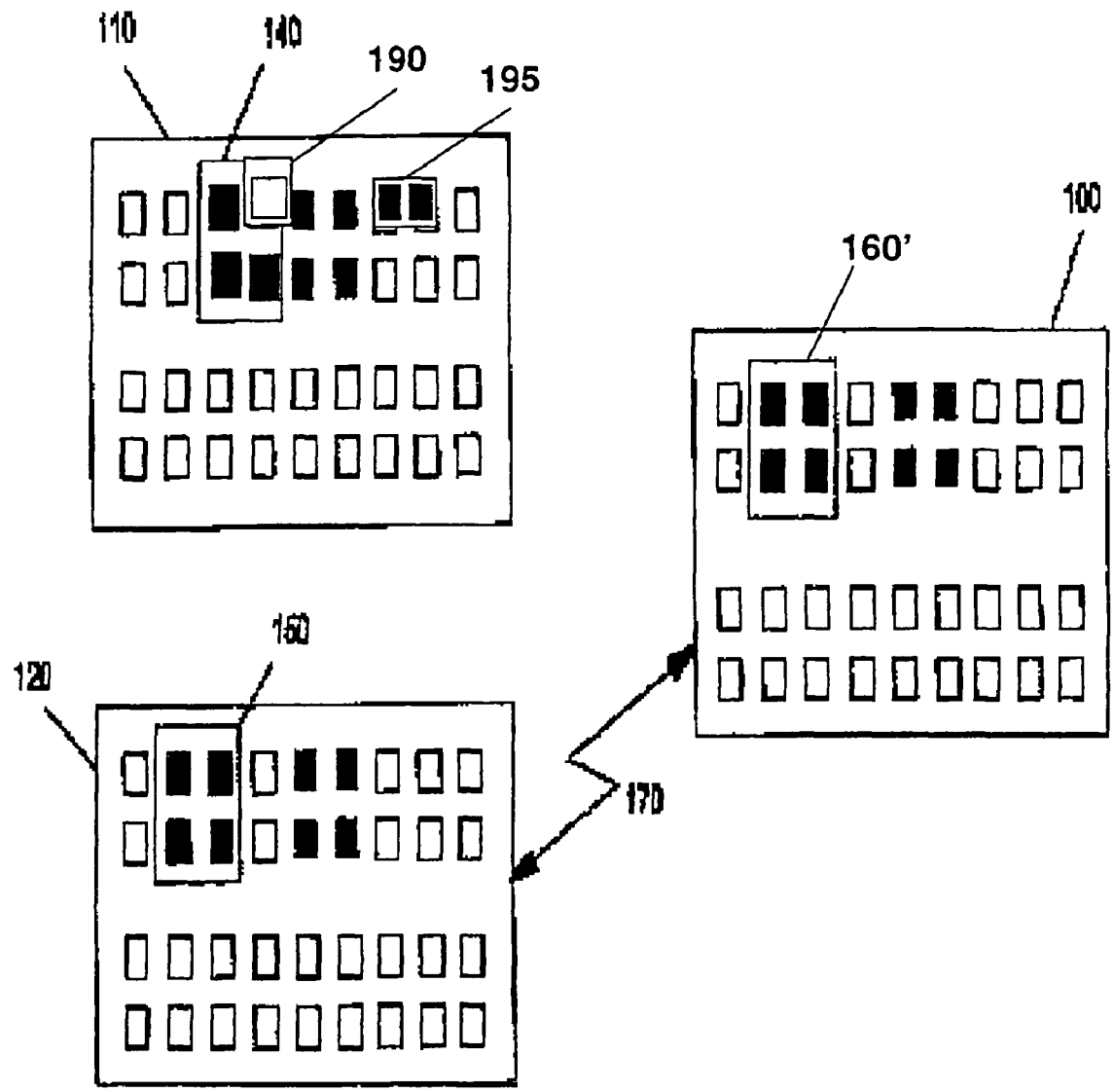
FIG. 3 is an example user view according to FIG. 2 after multiple transactions on replica 110 and consolidation between replica 120 and master copy 100 of a database reflecting seat reservations.

Let us assume that the client system maintaining replica 120 is the first to request consolidation 170. Note that replica 110 still has local update 140 which has not been consolidated with other replicas, and which are now inconsistent with the master copy of the data. Since there is no consolidation processing currently in progress and there is no conflict between updates applied to the master copy and updates applied to replica 120 since their last consolidation, the updates will be successfully applied 170 to bring the replica 120 and the master copy 100 into a consistent state, see 160 and 160' as shown in FIG. 3. After consolidation between the master copy and replica 120, further updates may be applied to the replica 120 or the master copy 100, and further updates may also be optimistically applied to replica 110.

Let us assume that two further updates 190 and 195 are applied to replica 110 as represented in FIG. 3. Update 190 amends update 140 by cancelling a passenger from a window seat, therefore update 190 is dependent on update 140. Update 195 assigns two unallocated window seats to two new passengers, therefore update 195 is not dependent on any previous update.

Figure 4:
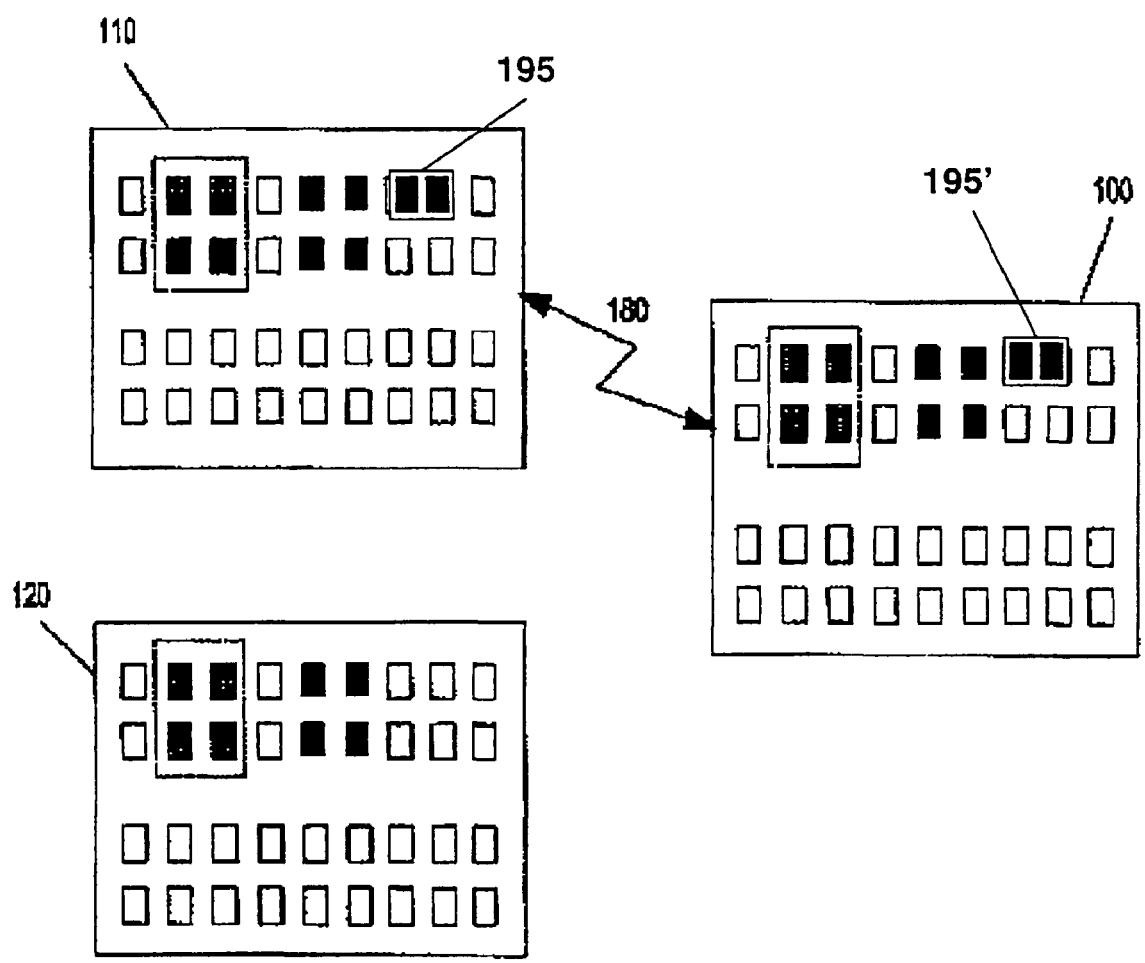
FIG. 4 is an example user view according to FIG. 2 and FIG. 3 after consolidation between replica 110 and master copy 100.

The client system maintaining replica 110 now attempts to consolidate 180 with the master copy 100 of the data. The results are shown in FIG. 4. Update 140 now conflicts with the consolidated update 160' to the master copy and it is not applied. Furthermore transaction 190 which does not conflict with transaction 160' is not applied because it does depend on conflicting update 140. However update 195 is applied to master copy 100 at 195' because it does not conflict with any other update and does not depend on any update which conflicts. Updates 140 and 190 are backed out. The updating application running at the client system is notified, either by a return value to a synchronous consolidation request or, in the preferred embodiment, by an asynchronous callback to an asynchronous consolidation request. The local update is backed out by reinstating (temporarily) the "before update" image of the data.

Then the "before update" image is overwritten with the latest updates to the master copy 100. The result of this is shown in FIG. 4. In this example, all copies of the data are now consistent, with conflicting client updates not having been allowed to change the master copy. This has been achieved without complex programmatic conflict resolution processing at any of the systems in the network.

Note that at no point during this process has either of the client replica 110 or 120 been prevented from applying updates to any element of data.

Thus each travel agent and the airline has a copy of the seat reservations, and two or more agents may 'optimistically' update their own view of the data to attempt to reserve the same seat. Initially, these updates are not committed. On subsequent consolidation, one agent sees a successful consolidation with their updates committed, whereas the others see a failure of some updates due to the first agent now holding the seat. Neither agent needs a connection to the airline's copy of the database table in order to request the reservation, but the reservation will only be processed locally until the update is consolidated with the airline's copy.

It should be noted that the present invention does not require synchronization of all replicas at any one time (although this could be implemented using conventional techniques if global syncpoints are required for other reasons), and does not require the master copy to immediately reflect the very latest updates performed at client systems.

Instead, the invention allows each replica to be updated independently of each other and independently of the master copy, but for the update transactions to be held in doubt until they are subsequently consolidated with the latest version of the master copy of the data. Sufficient information is held for backing out conflicting updates (sequence number and the local replica's incremental changes—see above) and dependent updates, preferably without reliance on database logs. Any non-conflicting and nondependent updates are applied to the respective one of the local replica or master copy of the database, and any conflicting and dependent updates result in a back-out at the client. This backout is achieved by reinstating the image of the relevant database elements and then overwriting the relevant database elements at the client using the corresponding data from the server.

By handling each update as a separate transaction, only a small number of local replica updates have to be backed out in most cases, although it is preferred that all updates entered between consolidation points will be identifiable as a set in case they are deemed interdependent by the user or updating application program. In one embodiment of the invention, a set of updates to data elements (such as booking seats in an aircraft for a group) can be applied together as a single transaction or explicitly flagged as an interdependent set of transactions, so that if one update cannot be applied to the server's master copy of the data then they will be backed out as a set at the client.

A degree of short term inconsistency between replicas of the data resource has been accepted to achieve improved concurrency and availability of data, with optimistic updating of local replicas of the data and a backout processing. All updates are eventually applied to all replicas of the data unless they conflicted with updates applied to the master copy or are dependent, and problematic data conflicts are avoided by the decision to accept the master copy's validity in the case of conflicts.

Figure 5:
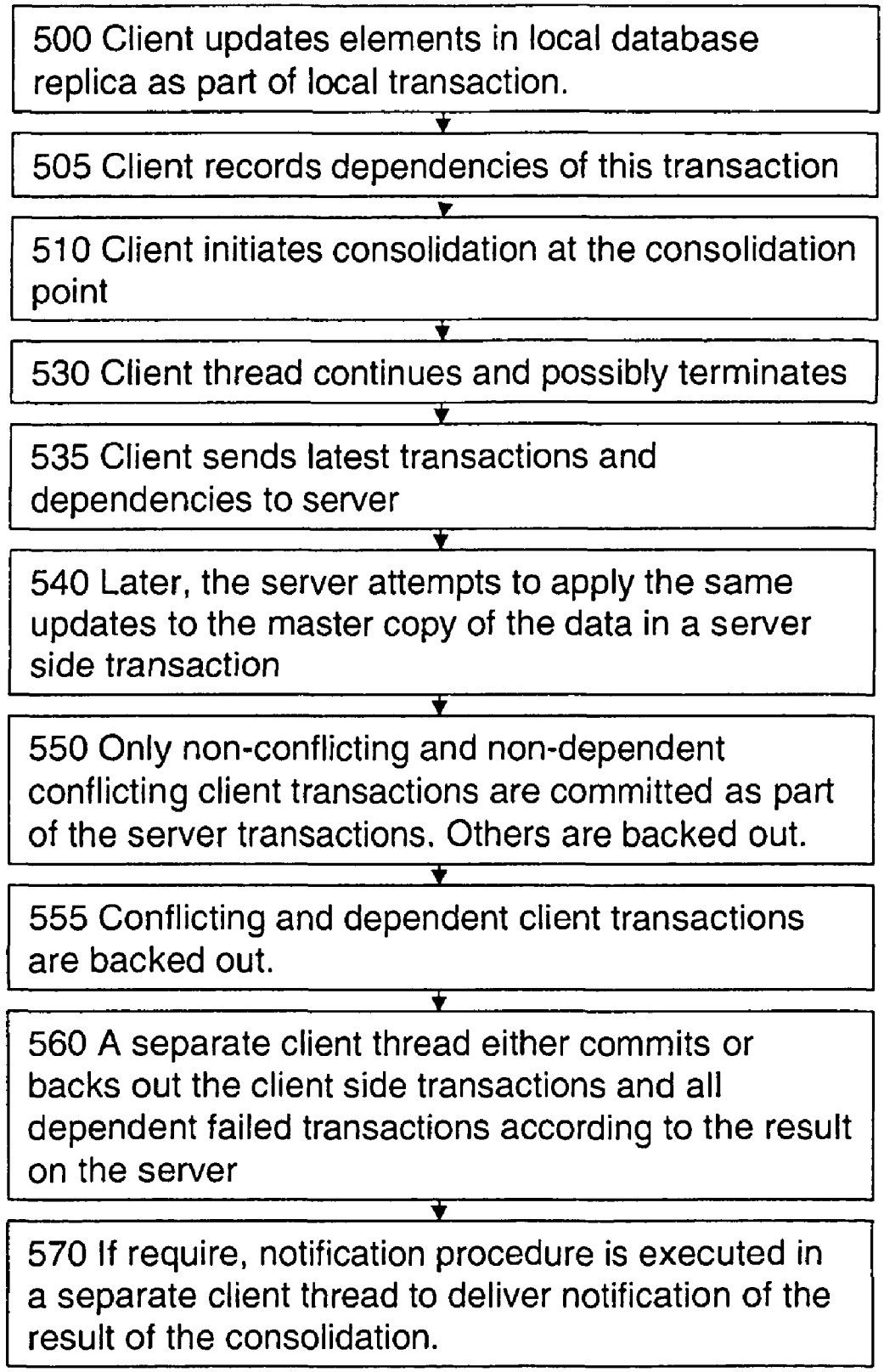
FIG. 5 is a schematic flow diagram showing the sequence of steps of a method implementing the present invention.

A specific implementation will now be described in more detail with reference to FIG. 5. As described above, updates can be applied to a local replica of a database without requiring continuous access to the master copy of the database held on a server, without requiring all replicas to be concurrently locked for synchronization, and without complex programmatic conflict resolution processing.

The client updates (step 500) elements in the local database replica as part of a local transaction. When updates are applied locally, the database manager program 20 updates the relevant rows and columns of the database 40 as one or more local transactions in response to user input via the local application program 60.

The client records (step 505) dependencies of this transaction. The database manager program 20 is free to update the local modified rows again, however all updates that depend upon a prior, non-consolidated update are recorded as being dependent upon their prior update. When local updates are completed, the client records each update against elements in the replica. Each dependent update is recorded in a dependency table that identifies the depending update and the dependent update.

The client initiates consolidation (step 510) at the consolidation point. The client consolidates the updates performed on the local copy and any updates performed on the master copy of the database held at the server. This involves the local database manager program 20 sending an asynchronous request message to the server system 50 holding the master copy 35 of the database. The database manager program 20 running on the server 50 receives these requests and places them in a FIFO queue for serialization.

The request includes: a unique unit of work identifier for the request; the highest sequence number in the table (in order to determine which updates the replica has not yet applied); and, for each changed data element, the new state of each changed data element (i.e. added, deleted, replaced); the new data (if any); and the sequence number for the version of the master copy on which the update is based.

The client thread continues (step 530) and possibly terminates.

The server attempts (step 540) to apply the same updates to the master copy of the data in a server side transaction. When ready to process a next consolidation request, a consolidation manager process 70 within the database manager 20 of server computer 50 processes this information within the request to identify which rows of the database tables have been updated since the last consolidation with this replica. This is managed by comparing a replica database table row's sequence number with the sequence number of the corresponding row in the master copy.

The sequence number is incremented in the master copy of the database whenever the respective row of the master copy's database is updated, and this sequence number is copied to the corresponding row in a replica when that replica is consolidated with the master copy. Hence, the database table rows of the master copy always retain a sequence number which can be checked against the database rows of a local replica to determine a match. If they match, then that row of the master copy of the database has not been updated since it was consolidated with this local replica, and so any updates applied to that row of the local replica can be safely applied to the master copy at consolidation time. In that case, a set of one or more server side transactions applies to the master copy the updates defined in the request message and the transactions are committed 250.

If they do not match, then that row has been updated in the master copy, and in that case the server side update transaction is backed out 250. All dependent updates are not applied and marked as failed. This is notified to the client side and the in-doubt client-side transaction which applied the conflicting update is also backed out 260 along with all dependent updates. Next, the updates which had been applied to the master copy before consolidation (including those which led to the mismatch) are applied to the local replica.

The server response includes: a list of transaction results; a list of rows to insert; a list a rows to delete; and a new sequence number for the new version of the master copy.

No conflicting and no dependent updates are committed, the server commits 550 non-conflicting and nondependent updates. Hence, if the database rows updated in the local copy are different from the rows updated in the server-based master copy, all updates are successful. Whereas, if conflicts are identified when consolidation is attempted, all conflicting local updates since the last consolidation point are backed out and the relevant database table rows of the local replica are overwritten using the updates applied to the corresponding rows of the master copy of the database.

The server backs out (step 555) all conflicting and dependent updates.

A separate client thread can either commit (step 560) or back out the client side transactions, according to the result on the server.

If required, notification procedure is executed (step 570) in a separate client thread to deliver notification of the result of the consolidation.

The programming construct implemented by the present invention may be called a "Consolidation Point"—a place in the logic of a program where updates to a copy of a resource are to be merged with another copy. Although the preferred embodiment described above includes synchronous processing for the database merge operation, this could be completed asynchronously in alternative implementations.

The resource in question could be a database table, or a queue, or generally any data where a copy is held locally for update. The result of the merge is reported back to the program as success or failure of the merge. If the merge succeeds, the updated values persist in both copies of the resource. If the merge fails, perhaps due to some conflicting update in the merge processing, then the local copy of the resource elements is updated to be the same as the remote server copy. Thus, in the event of the merge processing failing because there are conflicting updates, the resource elements will be returned to a known consistent state. No elements are ever locked during these updates which reduces delay between operations. Failing updates will automatically trigger the failure of all the dependent updates as the server is aware of the dependencies and does not even attempt to apply them.

The invention applies to situations in which there are two copies of a table, or many copies.

The "Consolidation Points" define a section of program logic where either all of the changes to elements in the local copy within the scope of a single transaction are merged, or none of them are merged.

This programming construct is similar in concept to a "Synchronisation Point" in distributed transaction processing, however instead of fixing a place in the logic of the program where updates to resource managers commit or back out, this fixes a place in the logic of the program where a set of updates to a table are merged with another copy of the table, the merge either succeeds or fails. A "Consolidation Point" and the "Synchronisation Point" could be one and the same place in the program logic.

In preferred implementations, the state of the tables is well defined and easy to program to. It is either the state before or after all of the updates are applied, and if the merge of the two resources fails then the updates that were not applied are also well defined. Furthermore the updates to the replica can be coordinated with transactional resources by executing the prepare phase of a two phase commit where the entity performing the consolidation is also of the two phase commit coordinator.

In many conventional solutions, a replication error is reported in an error log. This has three significant disadvantages: it is not easily accessible to the program logic; the precise scope of the failure is not defined, in fact in most cases some of the updates are applied; and the updates cannot easily be coordinated with other updates.

Additional embodiments and variations of the embodiments described herein in detail will be clear to persons skilled in the art, without departing from the described inventive concepts. For example, the embodiments described above include submitting a request for consolidation which request includes all of the required information for identifying data conflicts, whereas alternative embodiments may include an asynchronous request for consolidation followed by the server establishing a synchronous communication channel with the client system for exchanging information and identifying conflicts.

In another implementation, some applications may require an automatic retry of one or more of the data element updates that are within a failed encompassing update transaction. If the application or the local replica's database manager program is notified of which data element update resulted in a conflict with the master copy, it will be possible to retry all or a subset of the other data element updates. This may be done as a set of separate transactions or as a single transaction which encompasses all of the failed transaction's data element updates except the one which caused the failure.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

The invention claimed is:

1. A method for managing updates to a replicated data resource, comprising the steps of:
   applying a first update and one or more dependent updates to a first replica of the data resource at a first data processing system to update certain data on the first replica;
   comparing said updated data of the first replica with a master copy of the data held at a second data processing system defining a master server connected to a plurality data processing systems;
   if said updated data of the first replica does not conflict with corresponding data on the master copy and is not dependent on a conflicting update, applying the first update and one or more dependent updates to the master copy;
   if updated data of the first replica conflicts with corresponding data on the master copy, backing out said first update and all dependent updates from the first replica and replacing them in the first replica with the corresponding data on the master copy; and
   recording a history of chained optimistic transactions, wherein each successive update of a replica is handled as a separate transaction.

2. A method according to claim 1, wherein:
   said step of applying a first update and one or more dependent updates to the first replica comprises performing a plurality of updates at the first data processing system and recording all dependent updates on the first replica;
   a process at said second data processing system initiates one or more updates at the second data processing system to apply said one or more updates to the master copy of the data resource;
   said step of applying said non-conflicting updates comprises committing the respective transactions at the second data processing system and at the first data processing system; and
   said step of backing out said conflicting updates from the first replica and replacing them is implemented by backing out the respective transactions at both the second data processing system and at the first data processing system, and applying the conflicting updates of the master copy to the corresponding data elements of the first replica.

3. A method according to claim 2, wherein:
   in response to updates applied concurrently to a plurality of replicas of the data resource, the application of the replicas' updates to the master copy of the data resource is serialized such that only one replica of the data resource will be consolidated with the master copy at any one time.

4. A method according to claim 3, wherein:
   the plurality of replicas are held at a plurality of data processing systems, and each of said plurality of systems sends to the second data processing system requests to apply their updates to the master copy; and
   said process at the second data processing system serializes received requests to apply updates, to ensure that only one replica of the data resource will be consolidated with the master copy at any one time.

5. A method according to claim 4, wherein a request is sent to the second data processing system in response to completion of one or more transactions at a respective one of the plurality of data processing systems.

6. A method according to claim 4, wherein said requests to apply updates are sent via asynchronous messaging.

7. A method according to claim 4, wherein said requests contain a description of the one or more updates applied to the respective replica.

8. A method according to claim 7, wherein said requests also include an incremented version identifier for the updated data elements, for comparison with a current version identifier for the corresponding data elements of the master copy.

9. A method according to claim 7, wherein said description includes an identification of the version of the master copy which was last consolidated with the respective replica, for comparison with a current version identifier of the master copy.

10. A method according to claim 1, wherein the updates comprise orders for goods or services.

11. A method according to claim 1, wherein comparing said updates applied to the first replica with a master copy of the data resource comprises comparing version identifiers for data elements of the data resource, the version identifiers being incremented when updates are applied.

12. A method for managing updates to a replicated data resource, comprising the steps of:
   in response to a first update and one or more dependent updates applied to a first replica of the data resource at a first data processing system, comparing said updates with a master copy of the data resource held at a second data processing systems defining a master server connected to a plurality data processing system;
   for said updates which do not conflict with the master copy, applying said non-conflicting updates to the master copy;
   for said updates which conflict with the master copy due to other updates applied to the master copy, sending to the first data processing system an instruction to back out said conflicting updates from the first replica and to replace them in the first replica with the corresponding other updates applied to the master copy; and
   recording a history of chained optimistic transactions, wherein each successive update of a replica is handled as a separate transaction.

* * * * *